United States Patent [19]
Nakata et al.

[11] Patent Number: 5,736,727
[45] Date of Patent: Apr. 7, 1998

[54] IC COMMUNICATION CARD

[76] Inventors: Eiichi Nakata, 336-13 Miwa-chou, Machida-shi Tokyo; Masahiro Hirayama, Koshahaimu 2-902, 1-2 Komatsugawa Edogawa-ku, both of Japan

[21] Appl. No.: 553,340
[22] PCT Filed: Jan. 6, 1995
[86] PCT No.: PCT/US95/00215
  § 371 Date: Nov. 22, 1995
  § 102(e) Date: Nov. 22, 1995
[87] PCT Pub. No.: WO95/19015
  PCT Pub. Date: Jul. 13, 1995

[30] Foreign Application Priority Data

Jan. 11, 1994 [JP] Japan .................. 6-012247

[51] Int. Cl.⁶ .............. G06K 7/00; G06K 19/00; G06K 19/06
[52] U.S. Cl. .............. 235/487; 235/486; 235/492
[58] Field of Search .................. 235/441, 384, 235/486, 492, 375

[56] References Cited

U.S. PATENT DOCUMENTS

| | | | |
|---|---|---|---|
| 4,942,534 | 7/1990 | Yokoyama et al. | 235/486 |
| 5,500,517 | 3/1996 | Caghostro | 235/486 |
| 5,574,270 | 11/1996 | Steyyen | 235/492 |
| 5,574,273 | 11/1996 | Nakagawa et al. | 235/492 |

FOREIGN PATENT DOCUMENTS

| | | | |
|---|---|---|---|
| 0302453 | 2/1989 | European Pat. Off. | |
| 4028966 | 3/1992 | Germany . | |
| 9303877 | 5/1993 | Germany . | |
| 0268390 | 11/1990 | Japan | 235/486 |
| 403194680A | 8/1991 | Japan | 235/486 |
| 404205079A | 7/1992 | Japan | 235/486 |

*Primary Examiner*—Hoanganh T. Le
*Assistant Examiner*—Thien Minh Le
*Attorney, Agent, or Firm*—Freilich Hornbaker Rosen

[57] ABSTRACT

Apparatus for infrared communication between a first electronic device (10, FIG. 7) such as a notebook computer which has a slot (84) for receiving an IC card, and a second electronic device (104) such as a computer, printer, etc. that has an infrared transmit/detect unit (100) (or another notebook computer with a slot). The apparatus includes an IC card (82) with a rigid frame (112, FIG. 8) having a front portion (114) that holds a connector (88), the frame having a rear portion (116) that projects rearwardly from the slot and that holds an infrared emitter (120) and an infrared detector (122). As a result, the first electronic device fixes the position and orientation of the emitter and detector. The IC card with the emitter and detector preferably has a width (W) and thickness (T) as prescribed by JEIDA and PC CARD standards. The emitter preferably includes a plurality of emitter elements (141–144) spaced laterally along the rear end portion of the card to provide increased power in a small thickness.

8 Claims, 4 Drawing Sheets

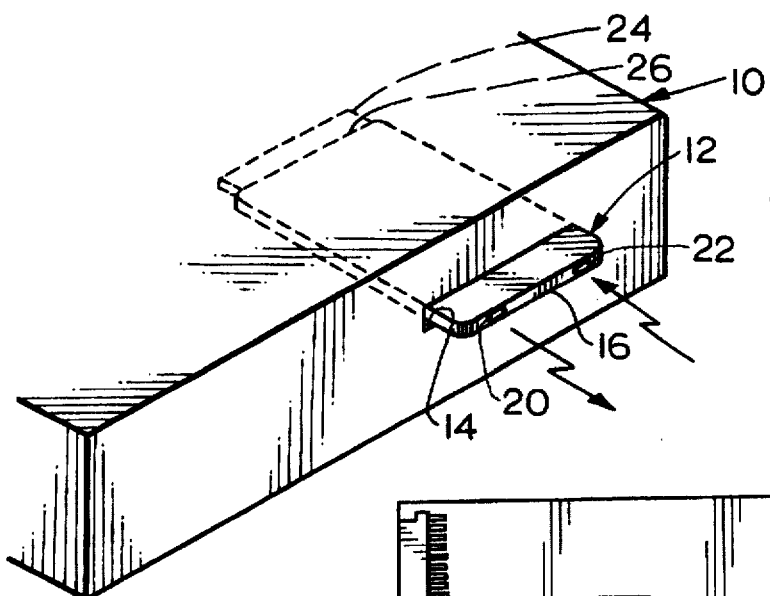
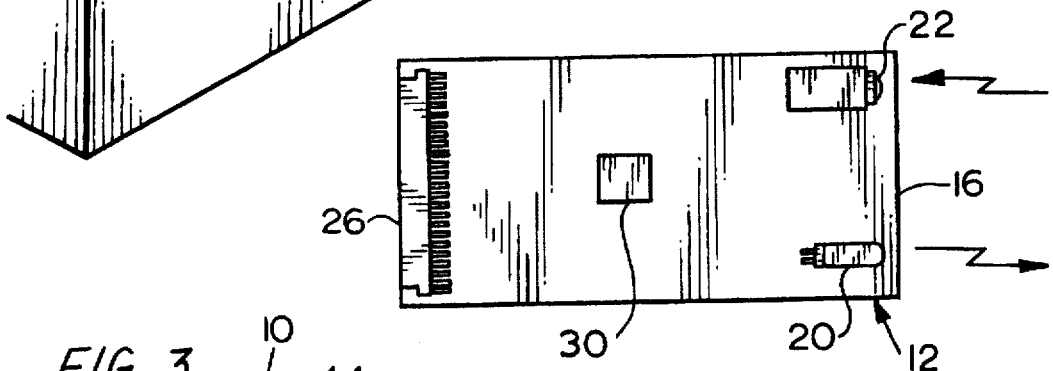
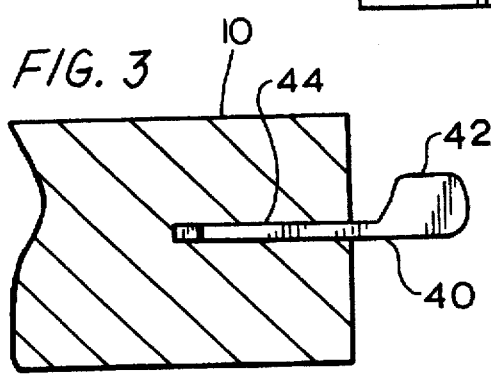
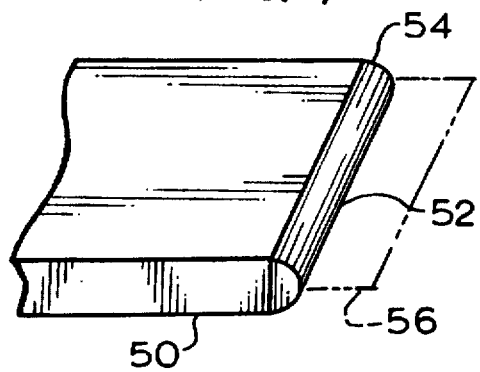
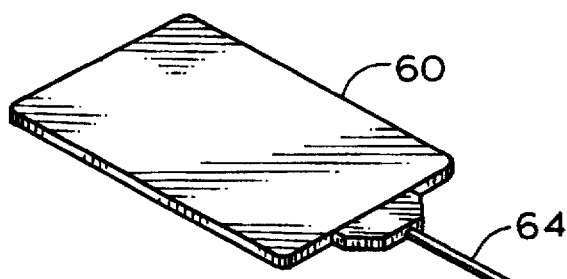
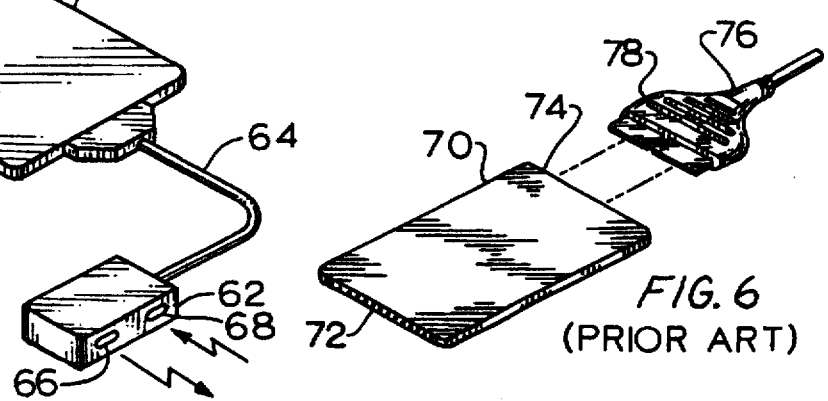

IC COMMUNICATION CARD

BACKGROUND OF THE INVENTION

Portable electronic devices such as notebook computers are increasingly being provided with a slot for receiving an IC card constructed in accordance with JEIDA and PCMCIA standards. Under such standards, each IC card has a card length of about 86 mm, a card width of about 54 mm, and a card thickness of about 5 mm. A variety of IC cards are available, including those with considerable memory so that data can be stored in a card and the data transferred to or from the electronic device and the card. The portable electronic devices may have other input/output ports.

It is often necessary to transfer data between the portable electronic device and a second device such a printer, desk top computer, etc. One technique for such transfer is to provide an IC card with a connector at its rear end, and a cable with one end that plugs into the card and another end that plugs into the second electronic device. Cables can be clumsy and inconvenient, and are not preferred for many of the same reasons that they are not generally used to connect a remote television control to a television set. Cables can be eliminated by connecting infrared emitter/detector units through short cables to each of the two electronic devices. However, in the case of the first electronic device, which may be a small portable computer, it can be annoying to have to store such a unit with its cable and to separately support the first electronic device and the unit. An infrared communication system for connecting electronic devices, where one of the devices has a slot for receiving an IC card, which minimized efforts in storage and set up for infrared data communications, would be of value.

SUMMARY OF THE INVENTION

In accordance with one embodiment of the present invention, applicant provides a light communication capability for an electronic device that is designed to receive IC cards, which requires very little extra storage and which can be set up very easily. Applicant provides an IC card with a front portion for insertion into a card-receiving slot of the electronic device and with a rear portion which substantially projects from the electronic device and which carries a light emitter and/or a light detector. The emitter and detector are each mounted on the same rigid frame of the IC card which projects into the slot, so the rigid frame of the IC card maintains the emitter and/or detector in position and orientation. The light emitter and/or detector are each mounted substantially at the rear edge of the IC card and are oriented to emit light in primarily a rearward direction away from the card and to detect light passing in a primarily forward direction towards the rear of the card. The rear portion of the card preferably has about the same width and height as the front portion, which facilitates storage of the card. Considerable light transmitting capability is obtained in the small card thickness by providing a plurality of light emitter elements that are spaced along the width of the card at substantially its rear edge.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partial isometric view of an IC card and electronic device constructed in accordance with one embodiment of the invention.

FIG. 2 is a plan view of the IC card of FIG. 1, with the cover removed, and with some parts shown schematically.

FIG. 3 is a partial sectional side view of the electronic device of FIG. 1 and of an IC card constructed in accordance with another embodiment of the invention.

FIG. 4 is a partial isometric view of an IC card constructed in accordance with another embodiment of the invention.

FIG. 5 is an isometric view of a card and separate unit which can be used in the device of FIG. 1.

FIG. 6 is an exploded view of an IC card of the prior art and of a cable connector assembly mateable therewith.

DESCRIPTION OF THE PREFERRED EMBODIMENTS

Figure 7:
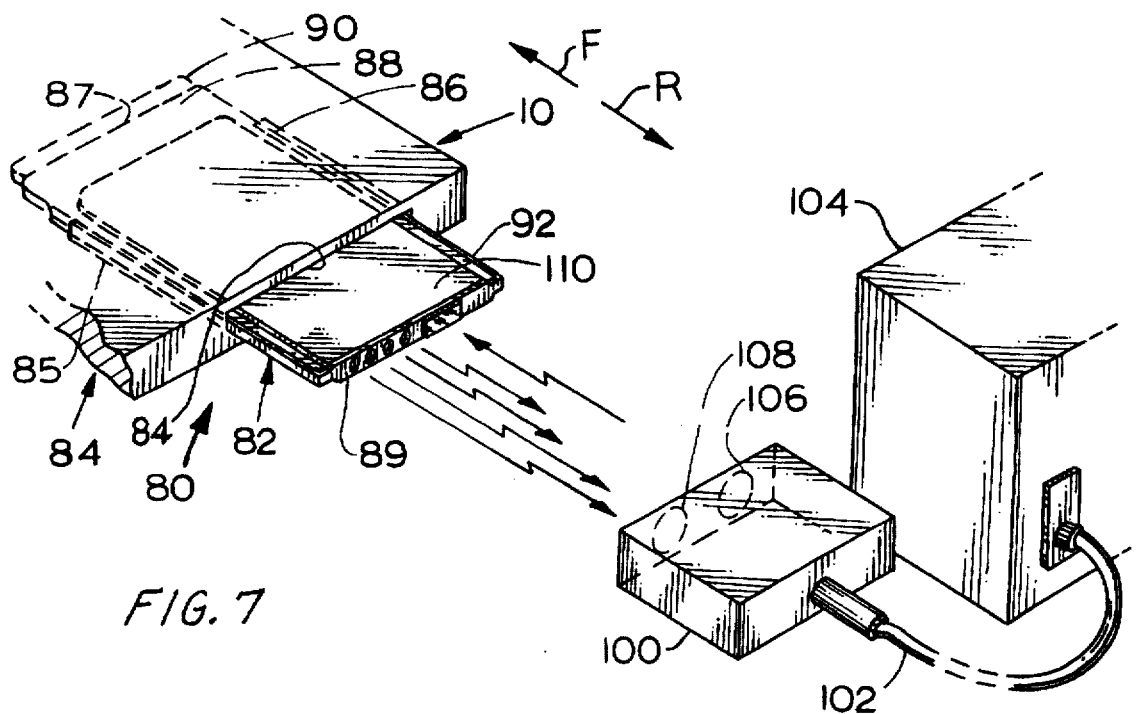
FIG. 7 is a partial isometric view of an IC card and first electronic device, shown in communication with a second electronic device.

FIG. 1 illustrates an electronic device 10 and an IC card 12 lying in a slot 14 of the electronic device. The IC card has a rear edge 16, projecting from the electronic device. An infrared emitter 20 and an infrared detector 22 lie substantially at the rear edge of the card and transmit and receive data. In most cases, the data to be transmitted is stored and/or generated in the electronic device 10. The data is passed through a device connector 24 at the forward or innermost end of the slot 14 to a card connector 26 at the front end of the card. That data is used to modulate the light output of the infrared emitter 20. Similarly, in most cases the data represented by modulation of the infrared light detected by detector 22 is converted into electrical signals which are transmitted between the connectors 24, 26 to circuitry within the electronic device 10. There can be cases where the transmitted and/or received data is stored in a memory chip within the IC card itself.

FIG. 2 shows the IC card 12 with the card connector 26 at its front end, with the emitter and detector 20, 22 lying at the rear edge portion 16. A control circuit 30 controls the flow of signals representing data between terminals of the card connector 26 and the emitter and detector 20, 22.

FIG. 3 illustrates an IC card 40 which is similar to that of FIGS. 1 and 2, except that the card 40 has a rear portion 42 which is of a thickness much greater than that of the forward card portion 44 that fits into a slot of the electronic device 10. The enlarged rear portion can be helpful to accommodate larger emitters and detectors.

FIG. 4 shows a portion of another IC card 50, wherein the rear edge portion 52 includes a cylindrical lens 54. The cylindrical lens 54, which is about half of a cylinder, collects light lying above or below the horizontal plane 56 of the card to provide more light for the detector, and also directs light emerging from the emitter so it extends more horizontally, FIG. 5 shows a combination of an IC card 60, an infrared transmit/receive unit 62, and a cable 64. This arrangement provides an IC card 60 which can be stored in storage compartments designed to receive "standard" IC cards. However, the unit 62 and cable 64 require a separate storage area. A case for holding a personal computer or other electronic device and several standard IC cards, would have to be build with a custom storage area for the unit 62 and cable 64. Also, when the combination of FIG. 5 is to be used, the unit 62 with its infrared emitter 66 and infrared detector 68 must be placed on a surface, and a weight or other holddown may be required to position the unit 62 despite any sideward urging by the bent cable 64. However, the combination of FIG. 5 has the advantage that the mechanical construction of the card 60 is similar to that of prior IC cards, which have connectors at their front and rear ends. FIG. 6 shows such prior card 70 which has multi-contact connectors 72, 74 at its front and rear ends. A cable assembly 76 includes a plug 78 that can be plugged and unplugged from the rear connector 74 of such card.

Figure 8:
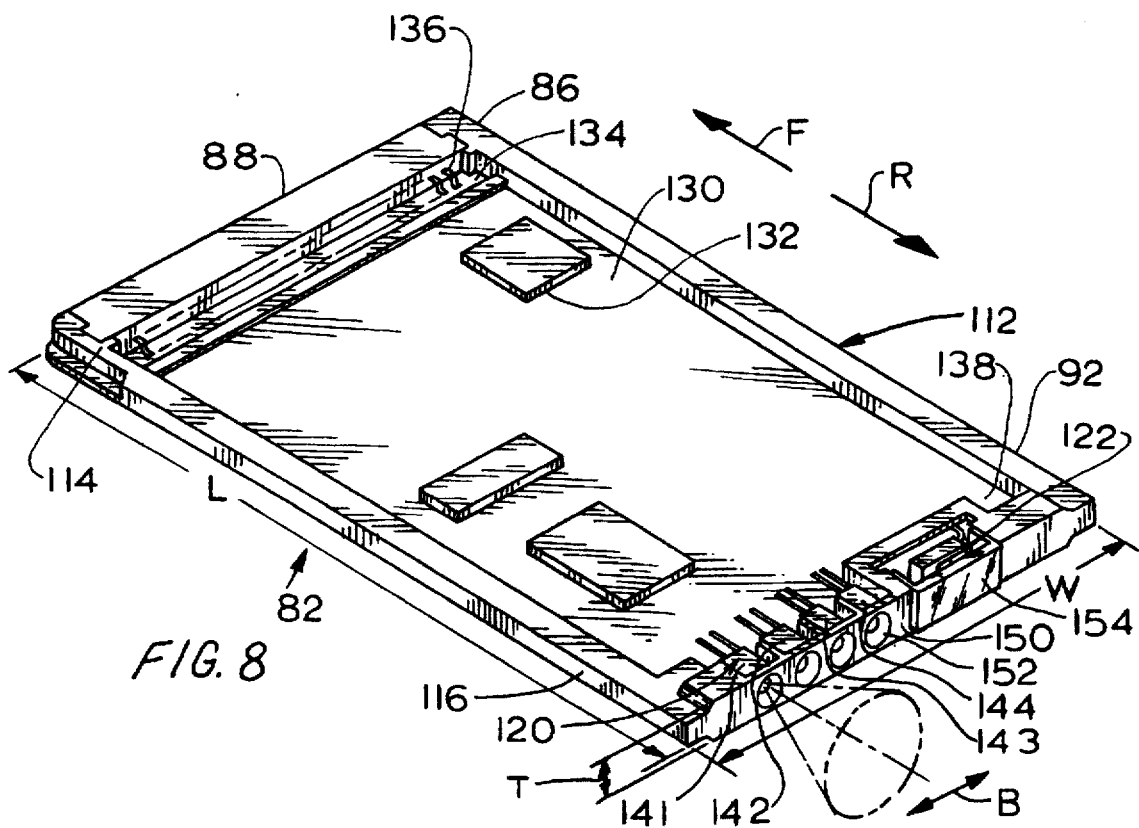
FIG. 8 is an isometric view of the IC card of FIG. 7, with the top cover removed.

FIG. 7 illustrates a combination 80 of an IC card 82 and an electronic device 84 such a notebook computer. As indicated in FIG. 8, the card 82 meets JEIDA and PC CARD standards, which require that the card have a card length L of about 86 mm, a card width W of about 54 mm, and a card thickness T of about 5 mm. FIG. 7 shows the card 82 inserted into a slot 85 of the electronic device and held in position by slot guides 85. It may be noted that the front of the card has a front edge 87 of about 3.5 mm thickness, while the rear of the card has a rear edge 89 of about 5 mm thickness. These thicknesses are of about the same magnitude because the smaller one (3.5 mm) is more than 50% of the larger one. A front portion 86 of the card has a front card connector 88 that mates with an electronic device connector 90 that lies at the inner end of the slot. A rear portion 92 of the card projects from the slot. The rear portion has an emitter and detector which emit and detect infrared light, for communication with a unit 100 that is connected through a cable 102 to a second electronic device 104 such as a printer. The unit 100 and cable 102 are stored with the second device 104, which is usually not portable, so the bulk of the unit 100 is usually not a significant disadvantage. The unit 100 has a considerable thickness to accommodate a relatively large emitter 106 and detector 108.

FIG. 8 illustrates the IC card 82, wherein a top cover 110 (FIG. 7) has been removed. The card includes a rigid frame 112 with a frame front 114 on which the front card connector 88 is mounted, and with a frame rear 116. A light emitter 120 and light detector 122 are mounted (indirectly) on the frame, so that the emitter and detector are fixed in position and orientation with respect to the rigid frame 112.

The card 82 includes a circuit board 130 with electronic components 132 mounted thereon. The circuit board has a front end 134 with traces (not shown) to which tails 136 of contacts of the front card connector 88 are soldered. The circuit board also has a rear end 138 with traces to which the emitter 120 and detector 122 are connected.

The emitter 120 is formed by four emitter elements 141–144. The frame has a rear barrier 150 at its rear edge, with the rear barrier lying immediately rearward of the emitter elements. The rear barrier has a plurality of holes 152 aligned with the emitter elements to pass light in a generally rearward direction from the emitter elements. A infrared window 154 is placed immediately rearward of the infrared detector 122 to pass only infrared light, and thereby block visible light and other frequencies that will tend to overload the detector 122. The detector 122 is oriented to detect light moving in a forward direction F towards the rear of the card.

Figure 9:
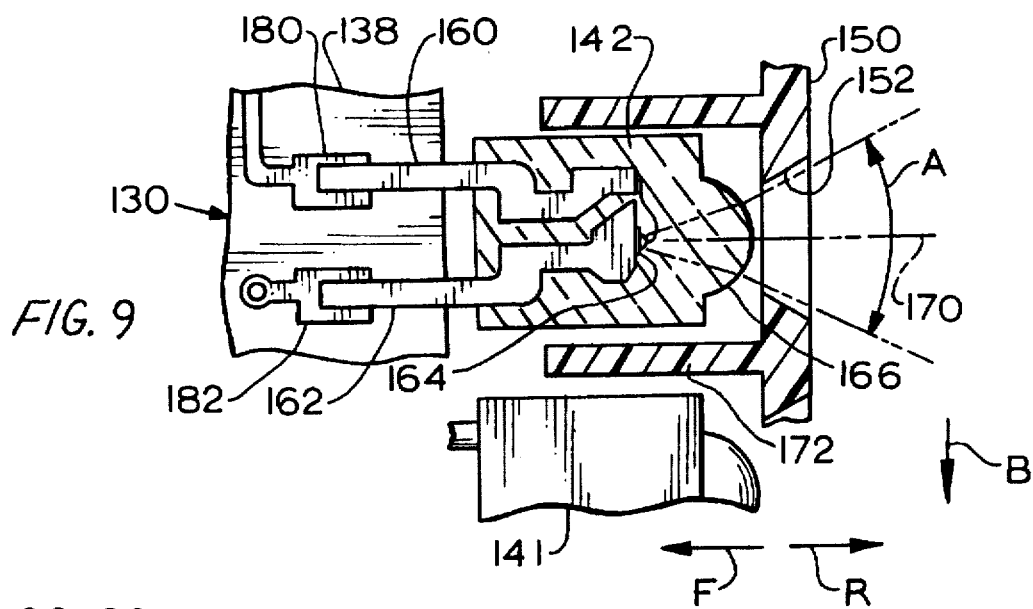
FIG. 9 is an enlarged view of a portion of the IC card of FIG. 8.

FIG. 9 illustrates one emitter element 142 and a portion of an adjacent emitter element 141. The emitter element such as 142, is an off-the-shelf item that includes a pair of terminals 160, 162 and a light emitting chip 164, all embedded in transparent plastic that includes a concentrating lens 166. The holes or openings 152 in the rear barrier 150 are of largely conical shape, and limit the emission of light so it is within a conical beam having a spread angle A of about 40 degrees (20° to 80°) around a forward-to-rearward axis 170 (about 20° above and 20° below). The rear barrier 150 also includes an opaque separator 172 on laterally (direction B) opposite sides of each light emitting element, to block any light from passing through an opening lying in front of a different element. Such separators block light from reaching other detectors of other devices in the vicinity, and generating noise in them.

Each emitter element is mounted and electrically connected by soldering its leads 160, 162 to corresponding pads 180, 182 at the rear end 138 of the circuit board 130. The barriers 172 only generally position the emitter elements. If an emitter element should be mounted in large misalignment with the axis 170 of a corresponding opening 152, then some light from that element will be blocked, and will not interfere with detectors of other electronic devices in the immediate environment. The fact that there are a plurality of different emitter elements, results in high assurance that there will be light transmitted throughout the intended conical beam of angle A. This allows communication with a known degree of misalignment between the emitter and detector elements of the two electronic devices. The provision of a plurality of emitter elements that are laterally spaced in direction B (parallel to the width W of the card) enables the rear portion of the card to have about the same thickness as the front portion, while still enabling considerable light energy to be transmitted. Such small thickness at the rear end enables the card to be easily stored in storage equipment intended for storage of other IC cards of the "standard" JEIDA and PC CARD shape and size. It is desirable that the width W and length L each be within 15% of JEIDA and PC CARD standards (86 mm and 54 mm, respectively) and that the thickness T be within 50% of JEIDA and PC CARD standards, to enable the card to be stored in space intended for storing "standard" IC cards.

Figure 10:
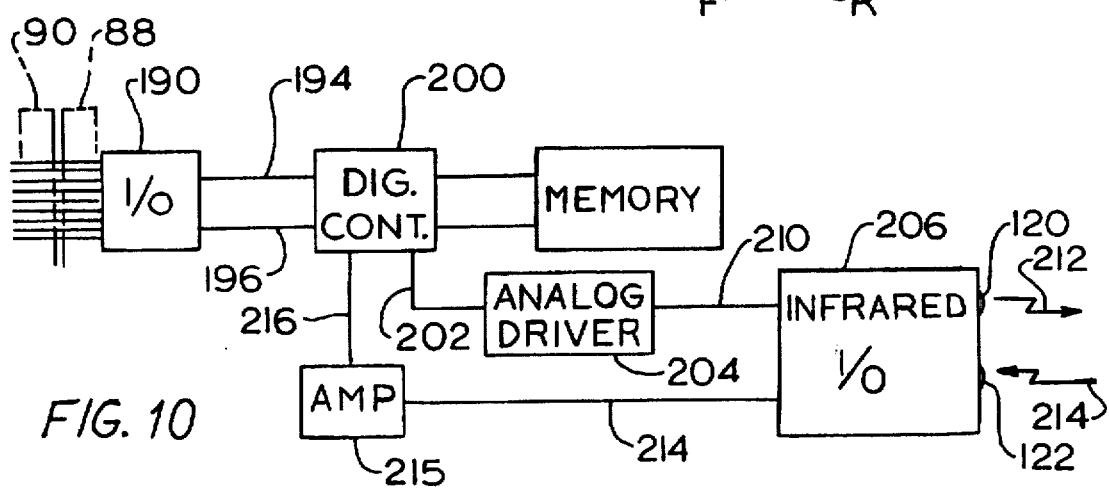
FIG. 10 is a block diagram of circuitry of the IC card of FIG. 8.

FIG. 10 is a block diagram of the electronic circuitry of the IC card of FIG. 8. Data is transmitted in eight bit parallel format over eight lines between the electronic device connector 90 and the card connector 88 to an input/output circuit 190 which changes its parallel input at 192 to a serial output at 194. Signals representing data on line 194 are delivered to a digital control 200 which formats the signals, as by generating appropriate signals at the start and stop of a data transmission, as well as to convert the digital data on line 194 to serial analog data on an output line 202. The signals on line 202 are delivered to an analog driver 204 which amplifies the signals and uses them to drive an infrared input/output 206 that includes the transmitter 120 and detector 122. The energy delivered over line 210 generates modulated infrared light which is transmitted as indicated by arrow 212. Light received as indicated by arrow 214 is detected by the detector 122 of circuit 206 which delivers its output on line 214 to an amplifier 215 which amplifies the signal and delivers it over line 216 to the controller 200. The controller 200 generates data representing the modulation of the detected infrared beam and delivers it over line 196 to the input output circuit 190. The circuit 190 delivers the data in parallel form to the electronic device.

Figure 11:
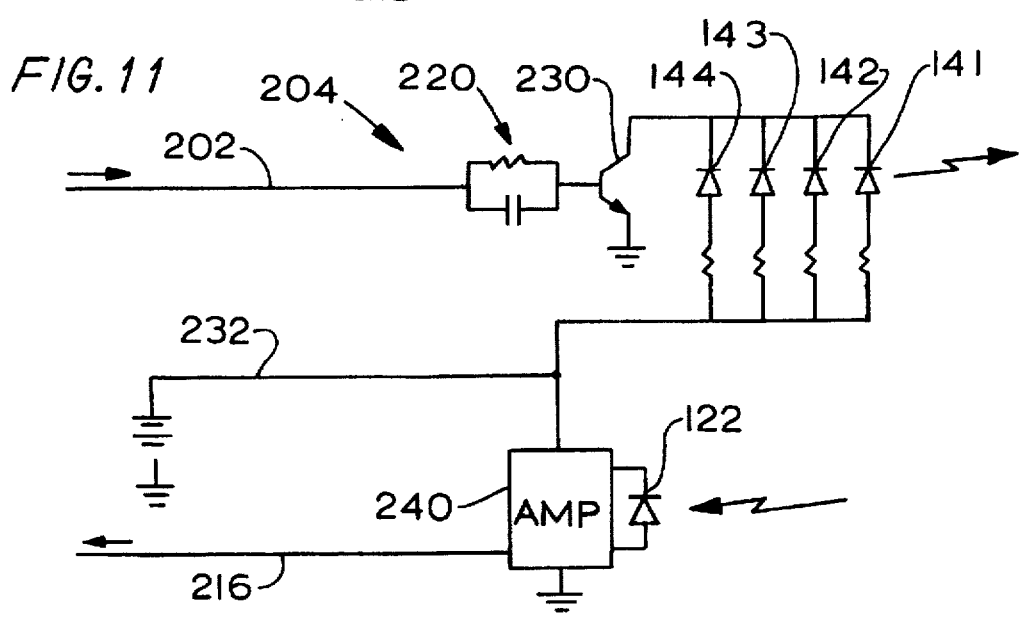
FIG. 11 is a schematic diagram of emitter and detector driving circuitry of the IC card of FIG. 8.

FIG. 11 illustrates details of the analog driver 204. Signals delivered over line 202 pass through a filter portion 220 to an amplifying transistor 230. Direct current power from a line 232 passes through the four parallel-connected emitter elements 141-144 to energize these elements and cause them to emit infrared light in synchronism (the modulation is in synchronism). The infrared detector 122 has its output delivered to an amplifier 240 which delivers its output through a line 216. The circuitry of FIGS. 10 and 11 are known in the prior art, and are presented only to provide an example of circuitry useful to energize the emitters and detectors of the IC card.

Figure 12:
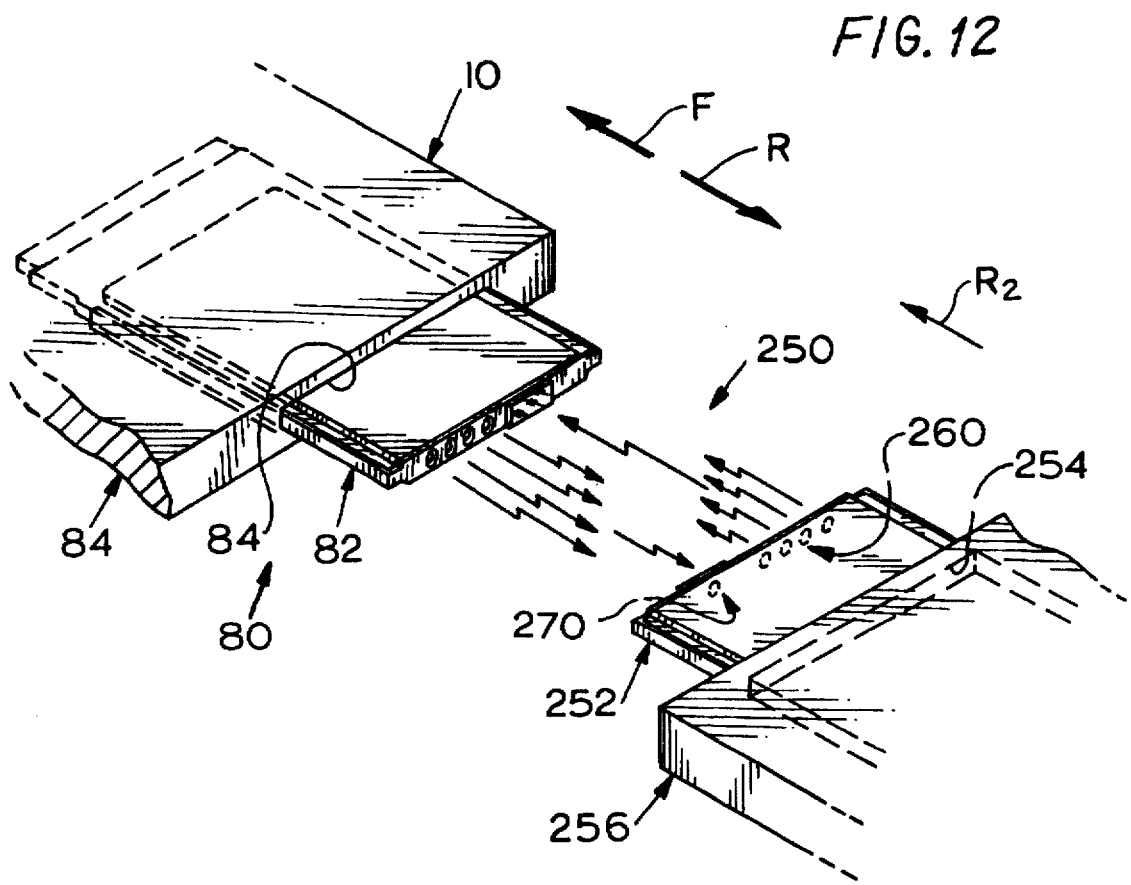
FIG. 12 is a partial isometric view of two IC cards and two electronic devices, each similar to those of FIG. 1, showing them in communication with each other.

FIG. 12 illustrates a setup 250 where the IC card 82 that lies in a slot of an electronic device 10, is communicating with another substantially identical IC card, or IC card element 252 that lies in a slot 254 of another electronic device or instrument 256. The instrument 256 is shown as another compact portable one such as a notebook computer. The IC card element 252 has an infrared emitter 260 comprising four emitter elements and an infrared detector 270 which faces in a rearward direction R2 with respect to the instrument 252. The use of two IC cards or card elements to establish data communication between two electronic devices or instruments that each have a card receiving slot 84, 254, makes communication especially convenient and at low cost.

Thus, the invention provides an IC card with a front portion for insertion into a slot of an electronic device, and a rear portion that substantially projects from the electronic device and that carries a light emitter and/or light detector. The IC card has a rigid frame, and the emitter and detector are fixed in position and orientation on the frame. It may be noted that while FIG. 8 indicates a frame 112 which is of molded plastic material, it is possible to construct the card with a rigid frame formed by metal, which may be in the form of metal halves that form metal top and bottom covers and metal sides and that are fixed to the card connector and or end(s) of the circuit board or mounts thereon. In any case, the frame forms a rigid structure that positions the front card connector 88 and the emitters and detectors. Although it may be possible to adjust the orientation of the emitter and/or detector, once adjusted they are held in a fixed position and orientation with respect to the electronic device that forms the card-receiving slot, by the rigid frame. This allows a person to begin infrared communication by inserting applicant's IC card with emitter and detector capability, into a card-receiving slot. Thereafter, the electronic device, through the rigid frame of the card, supports the emitter and detector and fixes their position and orientation. Although it is possible to mount batteries in the IC card, as where the card has an enlarged rear end as shown at 42 in FIG. 3, electrical energy is generally provided by the electronic device through the connector interface formed by the device connector and the card connector at the front end of the card.

Applicant obtains increased infrared light transmission by the use of a plurality of laterally-spaced emitting elements lying near the rear edge of the card. This allows applicant to use small off-the-shelf emitter elements that are of small enough size to fit into the card rear end where it is about the same thickness as the front portion, and still obtain a large light output. Although it is possible to transmit light in the visible spectrum, this is generally undesirable, partially because of interference from visible light in the environment. Applicant prefers to transmit and receive infrared light, of a wave length of about 950 nanometers. The emitters lie at the rear edge portion of the card and transmit light primarily in a rearward direction. The light detector similarly detects light passing primarily in a forward direction towards the rear edge portion of the card. A plurality of laterally-spaced detector elements can be placed near the rear edge.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. A combination of an electronic device which has walls forming a slot constructed to receive a first IC card constructed in accordance with JEIDA and PCMCIA standards wherein the first IC card has a card width of about 54 mm and a card thickness of about 5 mm, with said electronic device having a device connector at a front end of said slot, and an IC card having a front portion lying in said slot and having a rigid frame that is fixed in position and orientation on said slot walls and having a front connector mounted on said frame and mated with said device connector, characterized by:

said card has a rear portion which faces rearwardly out of said slot, and said card has a primarily rearwardly-facing infrared transmitter supported in position and orientation on said frame.

2. The combination described in claim 1 wherein:

said rear portion of said IC card has about the same thickness as said front portion of said IC card;

said infrared transmitter comprises a plurality of separate emitter elements spaced along the width of said IC card at rear portion thereof.

3. The combination described in claim 1 including:

an electronic instrument which has walls forming a slot which is substantially identical to the slot of said electronic device, and a second IC card which is of substantially the same size as said first IC card and which has a rear portion which projects rearwardly out of said slot of said electronic instrument, said second IC card having an infrared detector oriented to detect light from said infrared transmitter.

4. An IC card which has a front portion for insertion into a slot of an electronic device and which has a rear portion that faces out of the slot and away from the electronic device, with said rear portion having a rear edge, characterized by:

said IC card has a thickness and has a width and length that are each greater than said thickness;

said IC card includes a light emitter and a light detector that are each mounted on said card rear portion and that face primarily rearwardly;

said IC card includes a circuit board having conductors connected to said light emitter and to said light detector;

said light emitter includes a plurality of separate emitter elements spaced along the width of said rear edge, and electrically connected to be energized in synchronism.

5. The IC card described in claim 4 wherein:

said IC card includes an opaque rear barrier which has a plurality of substantially identical openings with each opening lying behind and in line with one of said emitter elements.

6. A method for transmitting data between first and second electronic devices, where said second device has at least an infrared detector and said first device has a PCMCIA standard slot with a front end, for receiving a first IC card having a PCMCIA standard card width of about 54 mm and a PCMCIA standard card thickness of about 5 mm, and said first device has a device connector at the front end of said slot, characterized by:

constructing said first IC card with a front card portion of about said card width and about said card thickness and with a card connector at said front card portion, and with a rear card portion that is fixed to said front card portion, and with an infrared emitter mounted in a fixed position and orientation on said rear card portion;

inserting said front card portion into said slot until said card connector and said device connector are mated, with said rear card portion substantially projecting rearwardly out of said slot;

orienting said first electronic device so said infrared detector of said second electronic device lies generally rearward of said slot;

transmitting data signals from said first device through said connectors to said card, and energizing said infrared emitter in accordance with said data signals to cause said infrared emitter to emit infrared light modulated by said data signals.

7. The method described in claim 6 wherein:

said step of constructing said IC card includes forming a rear card edge and placing a plurality of infrared emitter elements so they are spaced apart from one another in a direction parallel to said card width;

said step of transmitting data signals includes energizing all of said plurality of infrared emitter elements in synchronism.

8. The method described in claim 6 wherein said second electronic device has a second PCMCIA standard slot that is substantially identical to said slot in said first device, and wherein:

said step of constructing includes constructing said first IC card with an infrared detector mounted in a fixed portion and orientation on said rear card portion; and including constructing a second IC card which is of substantially the same size as said first IC card, and which has a rear card element portion with an infrared emitter and with a detector which forms said infrared detector of said second device, and inserting said second IC card into said second slot;

transmitting data from said second electronic device to said second IC card to cause said emitter of said second IC card element to emit infrared light, which is directed at said detector of said first IC card.

* * * * *